Aug. 16, 1960    M. L. LEVENE    2,949,596
ELECTRICAL CONNECTING DEVICE
Filed May 14, 1957
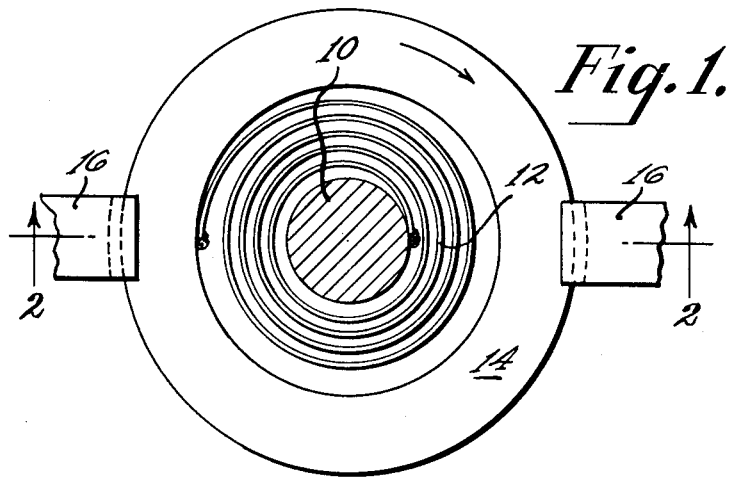
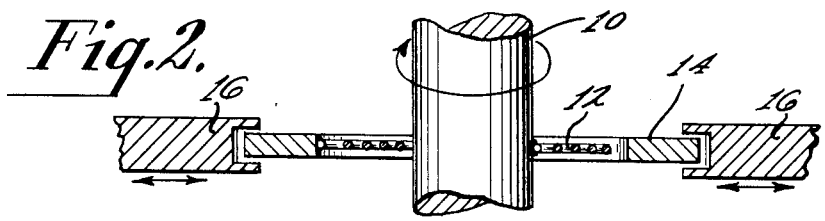
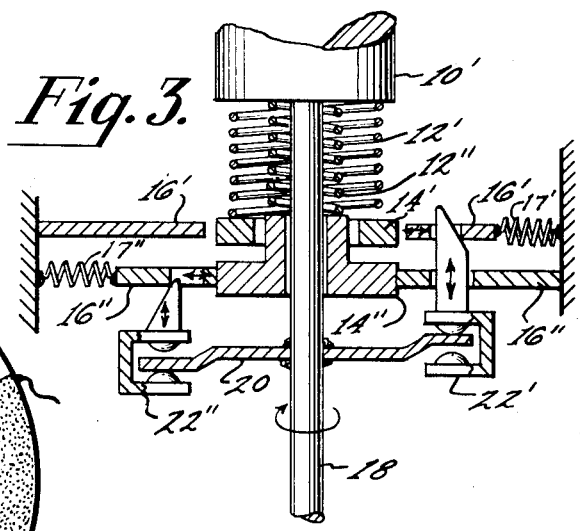
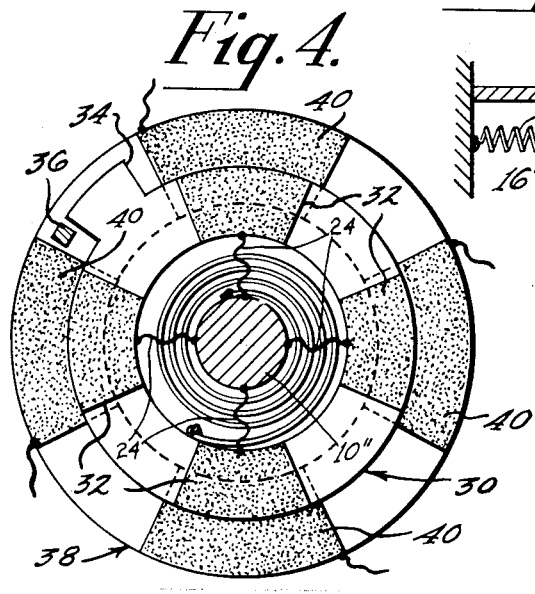
INVENTOR.
Martin L. Levene
BY
ATTORNEY.

United States Patent Office 2,949,596
Patented Aug. 16, 1960

2,949,596

ELECTRICAL CONNECTING DEVICE

Martin L. Levene, Philadelphia, Pa., assignor to Radio Corporation of America, a corporation of Delaware Filed May 14, 1957, Ser. No. 659,041

7 Claims. (Cl. 339—2)

This invention relates to electrical signal transmission, and more particularly to devices for making electrical connections between two relatively rotatable elements.

In many systems there is need for a continuous electric path between bodies in relative rotational motion. Common methods for solving this difficulty have involved slip rings, brushes, and sliding contacts.

Establishing an electrical circuit between moving bodies by a sliding contact introduces variations in the signal as the conductivity between the surfaces varies. Where the electrical potentials are at low levels, the transmission may be unreliable. Discontinuities introduced by the sliding contact may simulate the signals themselves and consequently introduce errors and spurious signals.

Accordingly, it is an object of the present invention to provide a device for electrically connecting two bodies in rotational motion relative to each other.

It is a further object of the invention to provide a signal path that does not utilize a sliding contact between bodies in relative motion.

It is a further object of the invention to provide a continuous signal path between bodies in rotational motion relative to each other which does not introduce a large noise factor.

According to the present invention, a ring or contacting member is concentrically mounted on and electrically connected to one of two relatively rotatable members by means of a concentric spring. The electrical signal path may proceed from the one member either through the spring itself or through a separate wire connected between the member and the ring. Contact is established between the one member and the other member by means of a clamp or grip which holds the ring stationary for a portion of the rotational cycle.

If continuous transmission is not required, the ring may be held for a portion of a revolution and then released. Rotational energy is stored in the spring and, when released, the ring "catches up" with the rotating member. Two rings, electrically connected in parallel, may be alternately held for continuous transmission over any portion of a cycle. One ring is gripped and transmits a signal, while the other is free to "catch up" with the rotating member.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a top sectional view of a single slip ring according to the present invention;

Figure 2 is a side sectional view of the slip ring of Figure 1 taken along the line 2—2 in the direction of the appended arrows;

Figure 3 is a side sectional view of a pair of slip rings connected to provide continuous transmission; and Figure 4 is a transverse cross-sectional view of a segmented disc for multiple signal transmission.

In the arrangement of Figures 1 and 2, a rotatable shaft 10 is connected to transducers (not shown) from which signals must be transmitted during motion. A conductive spring 12 connects the shaft 10 to a ring 14. The ring 14 may be supported by any suitable mechanical means (not shown) to prevent undue strain on the spring 12.

However, alternatively, the spring 12 may support the ring 14 and take on, as a result, a conical helical shape. A clamp 16 or holding member is mounted to grip the periphery of the ring 14 and is connected electrically to a circuit suitable for transmitting transducer signals to a utilization device (not shown). A suitable means (not shown) may move the clamp 16 into engagement with the ring 14 to clamp the ring 14 against rotation and complete the electrical circuit from the transducers.

In operation, the shaft 10 rotates and the spring 12 and ring 14 rotate with it. During periods of signal transmission, the clamp 16 is actuated and the ring 14 is held immobile. The shaft 10 continues to rotate and energy is stored in the spring 12. The spring may be of sufficient length to permit holding the ring during any desired amount of revolution of the shaft 10.

When signal transmission may be interrupted, the clamp 16 relaxes the ring 14 rotates under the combined influence of the spring 12 and the shaft 10. The ring and spring "unwind" sufficiently to "catch up" with the rotating shaft 10.

The alternative embodiment of the present invention of Figure 3 may be utilized when continuous signal transmission is desired. Two rings 14', 14'' are coupled, each by its own spring 12', 12'' to the rotating member 10'. A cam shaft 18 carrying a cam 20 is also connected to the rotating member 10'. A pair of clamps 16', 16'' is provided to alternately engage the conductive rings 14', 14'', respectively. A wedge arrangement 22', 22'' for each of the rings 14', 14'' alternately engages and disengages the respective clamps 16', 16'' as a function of the rotation of the cam 20.

The cam 20 is so shaped that one of the rings 14'' is held clamped and stationary, while the other ring 14' is released to "catch up" to the rotating shaft 10'. Should the electrical impedance of the spring be undesirably high, a single turn conductive wire might connect the shaft 10' and the transducers (not shown) carried thereon to the rings 14', 14''. The connection to the rings 14', 14'' is in parallel and the output from the clamps 16', 16'' might also be in parallel, thereby providing continuous signal output.

In operation, the transducers carried by the shaft 10' generate signals which are transmitted, in parallel, to both rings 14', 14''. As the shaft 10' rotates, the lobe of the cam shaft 20 alternately displaces the wedging arrangement 22', 22''. As the wedging arrangement 22' is cammed upward (as viewed in Figure 3), the clamp 16' is disengaged from the ring 14' and the upper ring 14' is free to rotate. At the same time, the second wedging arrangement 22'' is in the lowermost position and the corresponding clamp 16'' holds the lower ring 14'' stationary. As the shaft 10' continues to rotate, the right-hand wedging arrangement 22' is cammed downward and the compressed spring 17' urges the right-hand portion of the upper clamp 16' into contact with the upper ring 14'. The cam lobe continues around and the left-hand wedging arrangement 22'' is displaced upward, driving the left-hand portion of the lower clamp 16'' to the left against the restraining force of the compressed spring 17'' to release the lower ring 14''.

In applications where several transducers must be sampled, the alternative form of Figure 4 may be provided, in which a disc 30 is divided into a number of conductive segments 32. By way of example, an embodiment with four such segments 32 is shown in Figure 4. An indexing tab 34 on the disc 30 may cooperate with a pin 36 on a contacting mechanism. A separate conductive wire 24, of sufficient length to permit a single wrap around the shaft 10", connects each conductive segment 32 to a separate transducer (not shown).

A matching, segmented plate 38 may be mounted below the disc 30. A camming mechanism (not shown) elevates the plate 38 into contact with the disc 30. The plate may carry spring contacts on each segment 40 to establish contact between each pair of segments 32, 40. A separate output may be derived from each segment 40 of the plate 38 corresponding to a separate transducer. In intermittent operation, the contact plate 38 may be cammed into contact with the rotating disc 30 when the pin 36 on the plate 38 engages the tab 34 of the disc 30 and the disc 30 is held stationary. During the period of stationary contact, signals may be transmitted from the transducers through the separate segments 32, 40. The contact plate 38 may be retracted and the disc 30 is released to resume rotation.

Should it be desired to establish a greater contact area between the disc 30 and the contact plate 38 in order to transmit low level signals from a single transducer, a plurality of tabs 34 may be provided and all of the segments 32, 40 may be connected in parallel. Any engagement of a tab 34 by the pin 36 halts the rotation of the disc 30 and virtually all of the conductive surface may be used for signal transmission.

The arrangement of Figure 4 might easily be adapted to continuous transmission by the provision of a second conductive disc 30 (not shown), which is engaged alternately with the disc 30 of Figure 4. As in the device of Figures 2 and 3 above, the discs 30 and plates 38 alternately transmit the transducer signals.

Other modifications will be readily apparent to the person skilled in the art. The embodiments illustrated herein are exemplary only and should not be construed as a limitation on the invention. The spring may be coupled to the relatively stationary elements and the clamp connected to the rotating element. It is only necessary that relatively movable members be coupled elastically during portions of the movement and that the contact be broken periodically to permit "recovery" of the coupling members.

The invention may be adapted for use with any number of signal sources by providing a suitable number of signal paths between the transducers and the outputs of the stationary members.

Interrupted transmission may be easily achieved through the use of a single ring or disc, as illustrated in Figs. 1 and 2; continuous transmission may be provided merely by the addition of a second ring or disc working alternately in tandem, as illustrated in Fig. 3.

Thus, there has been provided a novel and improved means for interconnecting a signal source with a signal transmission system where there must be relative rotational motion between the signal source and the system.

What is claimed is:

1. In a system having two bodies rotatable relative to each other, means for electrically coupling said bodies during their relative motion without interrupting said relative motion comprising a holding member electrically connected to one of said bodies, a spring assembly including a spring, said spring being mechanically connected between said assembly and the other of said bodies, means for selectively moving said holding member into engagement with said spring assembly for establishing an electrical connection between said bodies, said spring being stressed by said relative rotation when said spring assembly is engaged and being released when said spring assembly is disengaged.

2. In a system having two bodies, one rotatable relative to the other, means for electrically coupling said bodies during their relative rotation comprising a pair of movable holding members connected to one of said bodies, a pair of spring assemblies each including a separate spring connected between the associated one of said assemblies and the other of said bodies, and means for alternately moving each of said holding members into engagement with a different one of said spring assemblies to establish a continuing electrical connection between said bodies without interruption of their relative rotation.

3. In a system having two bodies, one rotatable relative to the other, means for electrically coupling said bodies during their relative rotation comprising a holding member electrically connected to one of said bodies, a spring connected to the other of said bodies, a contacting member connected to said spring, and means for selectively moving said holding member into engagement with said contacting member to establish an electrical connection between said bodies, said spring being stressed by said relative rotation when said contacting member is engaged so that said relative rotation is not interrupted.

4. In a system having two bodies, one rotatable relative to the other, means for electrically coupling said bodies during their relative rotation comprising a pair of movable holding members electrically connected to one of said bodies, a pair of springs connected to the other of said bodies, a pair of contacting members each connected to a different one of said springs and driven thereby, and means for alternately moving each of said holding members into engagement with a different one of said contacting members to establish a continuous electrical connection between said bodies without interruption of their relative rotation.

5. Means for electrically coupling two bodies movable relative to each other comprising a movable holding member connected to one of said bodies, a spring connected to the other of said bodies, a contacting member connected to said spring and driven thereby, and means for grippingly moving said holding member into engagement with said contacting member to establish an electrical connection between said bodies during periods of said engagement without interruption of their relative motion, said spring being stressed by said relative motion when said contacting member is engaged and being released when said contacting member is disengaged.

6. In a system having two bodies rotatable relative to each other, means for electrically coupling said bodies without interruption of their relative rotation comprising a movable holding member electrically connected to one of said bodies, a spring connected to the other of said bodies, an electrically conductive ring connected to said spring and driven thereby, and means for selectively moving said holding member into engaging contact with said ring to establish an electrical contact between said bodies.

7. Means for electrically coupling two bodies rotatable relative to each other comprising a movable holding member electrically connected to one of said bodies, a spring connected to the other of said bodies and concentric therewith, an electrically conductive ring concentric with said other of said bodies and connected to said spring, and means for selectively moving said holding member into engaging contact with said ring.

References Cited in the file of this patent

FOREIGN PATENTS

| | | |
|---|---|---|
| 628,591 | Germany | Mar. 26, 1936 |
| 751,684 | Germany | Feb. 2, 1953 |
| 856,982 | France | Aug. 19, 1940 |